United States Patent [19]
Hirano

[11] 3,989,116
[45] Nov. 2, 1976

[54] BATTERY-POWERED CART
[76] Inventor: Fujikiyo Hirano, 78, 3-chome, Midorigaoka, Itami, Hyogo, Japan
[22] Filed: May 27, 1975
[21] Appl. No.: 580,879

[30] Foreign Application Priority Data
Oct. 29, 1974 Japan.............................. 49-125866

[52] U.S. Cl............................ 180/19 H; 280/DIG. 5
[51] Int. Cl.²......................................... B62D 51/04
[58] Field of Search.............. 180/19 H, 19 R, 65 R; 280/DIG. 5

[56] References Cited
UNITED STATES PATENTS

| | | | |
|---|---|---|---|
| 2,879,858 | 3/1959 | Thomas | 180/19 H |
| 3,247,923 | 4/1966 | Cornell | 180/19 R |
| 3,731,756 | 5/1973 | Hajec | 280/DIG. 5 |

*Primary Examiner*—M. H. Wood, Jr.
*Assistant Examiner*—John A. Pekar
*Attorney, Agent, or Firm*—George B. Oujevolk

[57] ABSTRACT

A battery-powered cart operatable by a man walking ahead through the medium of a rope attached thereto which is in a forwardly extended state. The rope is connected at the rear end via a sliding member to a spring attached to the cart at a predetermined position in a manner such that the spring urges the rope backwards as it is pulled forwards. The cart incorporates an electric motor, an electromagnetic brake, a battery, and speed-control system electrically connecting with said motor and brake so that the cart moves behind the operator at a speed similar to a man's average walking speed even on a slope, and reduces the speed or comes to a stop as the man slows down or stops because of the slack of the rope.

1 Claim, 3 Drawing Figures

BATTERY-POWERED CART

This invention relates to a battery-powered cart and more particularly a battery-powered cart operatable by a man walking ahead, said cart with a full capacity load thereon which is able to trail the preceding operator neither too close nor too far behind regardless of the situation of the ground they move on, said operation being conducted through the medium of a rope being attached and extended to said cart.

This cart, from a view point of functions thereof as described above, is preferably used at golf links to take the place of a caddy or any other place where similar work is required. Of course, there are various kinds of carts already available for this use, each being equipped with a sophisticated mechanism with the operator riding at the wheel thereof. These known riding vehicles, however, may have yet to give way to this cart from a view point of economy, health promotion, and creation of fun at least.

A main object of this invention is to provide a battery-powered cart capable of carrying a load under the guidance of a walking person through the medium of a rope attached to the cart, said cart being capable of travel closely behind the person but never being able to hit him from behind regardless of the ground conditions either sloped or not.

In order that this invention may be readily understood, a reference will be made to a preferred embodiment of this invention in relation to the annexed drawing in which.

Figure 1:
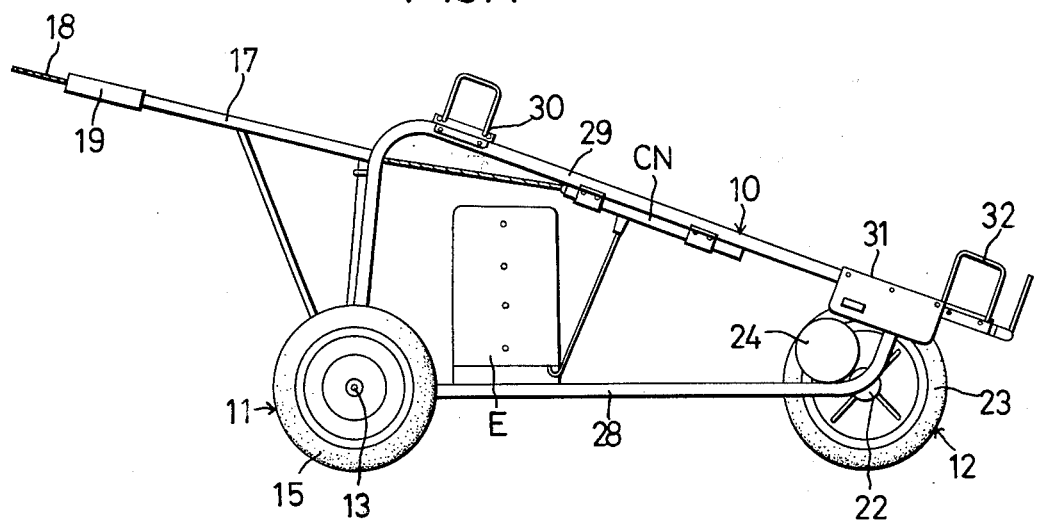
FIG. 1 is an elevation of a battery-powered cart of this invention.

In the drawing, numeral 10 designates a metal pipe assembled framework of this cart, and numeral 11 designates a front-wheel unit comprising a pair of wheels 15, a shaft 13 sustaining said wheels 15, and a direction-control rod 16 connecting at both ends thereof to said shaft 13 adjacent the ends thereof via arms 14. Numeral 12 designates a rear-wheel unit comprising a wheel 23, a shaft 22 sustaining said wheel 23, an electric motor 24 having a fixed magnetic field engaging with said shaft 22 via a reduction gear (not shown), and an electromagnetic brake 25 incorporated in said shaft 22 for bringing this cart from a moving state to a perfect stoppage.

The framework 10 comprises an upper frame 29 forwardly ascending and bending nearly vertically downward at the front end thereof connecting to the front-wheels shaft 13, and a bottom frame 28 connecting at the front- and rear- end portions to shafts 13 and 22, said bottom frame 28 further extending upward from a bending portion connecting to said rear-wheel shaft 22 thereby connecting at the upper tip of said extension to the upper frame 29 intermediately at the rear portion thereof. Said upper frame 29 at the rear end thereof bends nearly vertically upward thereby forming a supporting portion 32 where the load is prevented from sliding downward, plate-like pedestals 30 and 31 for resting a load thereon being provided at the front and rear portions respectively on said upper frame 29.

A handle member 17 through which a rope 18 extends pivotally connects to front shaft 13 so as to enable the front wheels 15 to be readily turnable in accordance with the change of direction of handle member 17 with the afore-mentioned direction-control rod 16 helping to ease the direction change in relation with said front shaft 13. A grip 19 is formed at the tip of a handle member 17.

The rope 18 slidably extends forwardly through a handle member 17 ahead of a framework 10, said rope 18 connecting at the rear end with a spring 21 via a sliding member 20 within an encased mechanical equipment CN as will be described later, said spring 21 at one end thereof fixing to said framework 10 at a suitable position thereof.

In the foregoing construction, upon pulling forward of said rope 18, a sliding member 20 advances and spring 21 is tensioned forward as the result thereby causing said sliding member 20 to be urged backward.

Figure 2:
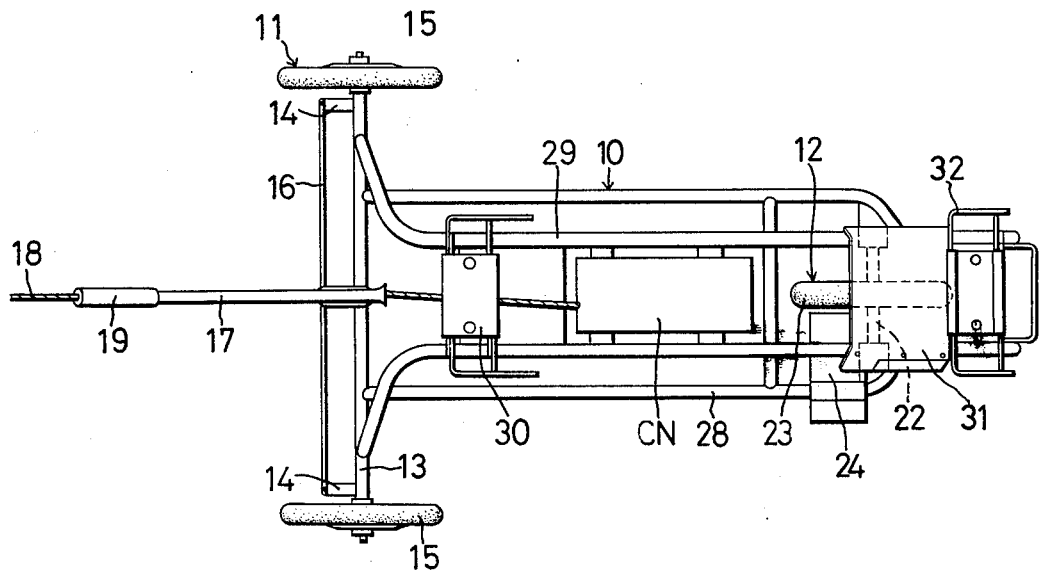
FIG. 2 is a top plan view of the above.

A battery as designated by E in FIGS. 1 and 2 is loaded on this cart for supplying power to motor 24 and electromagnetic brake 25.

This cart, as referred to already, incorporates an encased control system CN for controlling the power supply and accordingly the rotary movement of the rear-wheel 23 by the pulling strength imposed on said rope 18.

Figure 3:
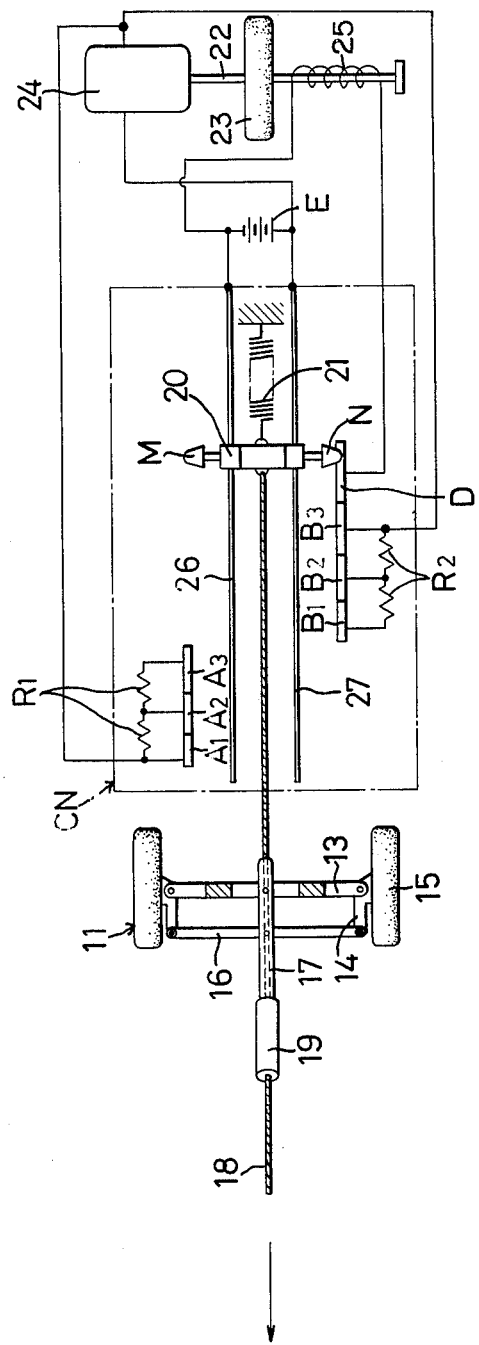
FIG. 3 is a schematic plan view of the above showing operational diagram thereof.

The control system CN comprises an electrically conductive guide rods 26 and 27 serving as a circuit for the motor 24 and for the electromagnetic brake 25 respectively, said guide rod 27 further serving as a closed circuit for the motor 24, said rods 26 and 27 being disposed longitudinally along said rope 18. The afore-mentioned sliding member 20 which connects with said rope 18 at the rear end thereof allows rods 26 and 27 to extend slidably therethrough as shown in FIG. 3. Accordingly, said sliding member 20 can move back and forth along said guide rods 26 and 27, moving forward upon pulling of the rope 18 and moving backward due to the backward urge of said spring 21 upon releasing of said rope from the pulling, needless to say.

The sliding member 20 at both ends thereof forms movable contacts M and N each communicating respectively with said guide rods 26 and 27, said M and N being electrically disconnected with each other.

Outside the guide rod 26 intermediately at the forward portion thereof are disposed driving contacts A1, A2, A3 in series, said group of driving contacts making on-and-off contacts with said movable contacts M of said sliding member 20 simultaneously with said rod 26 serving as a circuit for the electric motor 24 via a resistance R1 as the member 20 moves forward upon pulling of said rope 18.

Outside the other guide rod 27 intermediately at the back portion thereof are disposed control-contacts B1, B2, B3 in series, said group of control-contacts upon pulling of said rope 18 also making on-and-off contacts with the movable contact N of said sliding member 20 simultaneously with said rod 27 via the other resistance R2, said rod 27 serving as a circuit for the electromagnetic brake 25 and concurrently a closed circuit for the electric motor 24 as mentioned hereinbefore.

In the above-described construction, the electric motor 24 due to the magnetic field therein generates a counterelectromotive power when given a forced rotation thereto by the inertial rotation of the rear wheel 23 in the closed state of the closed circuit of motor 24 thereby imposing a resistance to the rotation of the rear wheel 23.

The disposition of the driving contacts A1, A2, A3 immediately ahead of the control-contacts group enables the rearmost contact A3 to make contact with the movable contact M immediately after separation of the control-contact B1 from the other movable contact N as the sliding member 20 moves forward.

Also outside the guide rod 27 at the rearmost position thereof is disposed a stop contact D which makes contact with the movable contact N simultaneously with rod 27 in the rearmost retreating of sliding member 20 when said rope 18 is released continuously from holding, said stop contact D thereby providing an electricity supply to the electromagnetic brake 25 through the rod 27 so that the cart keeps stationary even on a slope.

Needless to say, a switch (not shown) is provided at any desired spot on the cart for switching on and off the connection between the battery E and the circuits.

The practical operation of this invention cart will be described more in detail in the following passages.

When the rope 18 is free from pull and accordingly the sliding member 20 stays at the rearmost position with the switch turned on, the electromagnetic brake 25 is functioning to hold the cart stably in a stationary state. If the rope 18 is pulled forward in this state against the backward urge of said spring 21, sliding member 20 advances along guide rods 26 and 27 thereby causing separation of movable contact N from the stop contact D thereby cutting the power supply to the electromagnetic brake 25 with the result that the rear-wheel 23 is released from the braking.

As the sliding member 20 is traveling forward within the realm of the control-contacts, i.e. before passing by the foremost control-contact B1, the motor 24 is not fed power and accordingly no driving force is caused provided to the cart. The continuous pulling of rope 18 further forward results in the contacting of movable contact M with the driving contacts group, power supply to motor 24 begins thereby enabling the rotation of rear-wheel 23, said power supply and accordingly speed of rotation increasing as predetermined as the movable contact M makes one-by-one contact with contacts A3, A2, A1 with the reduction of resistance by resistor R1 in the above-mentioned numerical order.

Assume that the cart is designed so as to develop an hourly speed of 4 km at the maximum just corresponding to the average walking speed of a man, the operator of the cart may have to keep pulling rope 18 so as to keep movable contact M contacting with contact A1, and if the man slows down, the rope 18 naturally sets back and sliding member 20 withdraws with the result that the movable contact M changes the contacting "driving contacts" from A1 one by one to A2, A3 and accordingly lowering the speed of the cart according to predetermined gradients just contrary to the aforementioned accelerating case of the cart. If the rope 18 further withdraws bringing movable contact N to the state of contacting with the control-contacts group thereby closing said closed circuit of the motor 24, the inertial rotation of said rear-wheel 23 causes a forced rotation on the motor 24 thereby enabling the generation of a counterelectromotive power on said motor 24 resulting in the application of magnetic resistance to the rotation of rear-wheel 23, said resistance becoming the largest at the contact B3. When the sliding member 20 reaches the rearmost position thereby making contact at the contact N thereof with the braking contact D, electromagnetic brake 25 is electrified resulting in the application of braking to the rear-wheel thereby bringing it to a halt as described hereinbefore.

The energy required for pulling rope 18 that is equivalent to the elasticity of said spring 21 may be so little as to be disregarded.

When advancing on a downward slope, this cart can keep moving as slowly as on the level ground due to the mechanism thereof as mentioned hereinbefore, i.e. the cart being slowed down with the natural slack of said rope 18 as soon as the cart goes in a gravitational movement that may outrun the man.

It goes without saying that the invention cart having the foregoing construction must be designed elaborately and precisely before being put into manufacture so that the speed may be quite consistent with the walking speed of the operator in relation with the weight and loading capacity, also the limit of slope for the cart to be movable upward or downward must to be taken into account. In this embodiment, the cart is specified as follows:

weight — 22 kg; loading capacity — 20 kg;
maximum slope movable safely upward or downward — 30°
hourly speed on level ground:

| maximum (at A1) | 4 km |
| --- | --- |
| at A2 | 2.5 km |
| at A3 | 1.5 km | motor — 50 W(in average) 70 W(at the maximum)
battery — 12V 30 AH
dimensions — 135 cm (length) × 61 cm (width) × 53.5 cm (height)

The predetermined speeds as above-mentioned may be subject to ground conditions and inertial movement of the cart to some extent.

What is claimed is:

1. In a cart designed to be pulled by a person, said cart having a longitudinal frame (10), said frame defining front and the rear cart ends, with at least one cart drive shaft (22) at one end, a motor (24) and an electromagnetic brake (25) coupled to said drive shaft (22) supported on said frame, in combination:
  a. first and second electrically conductive guide rods (27, 26) longitudinally supported on said frame between said ends, said rods having connective leads for connection to a battery (E);
  b. a sliding member (20) disposed longitudinally for sliding motion along said guide rods (26, 27), first and second slide contacts (N, M) on said sliding member (20), spring means (21) attached to said frame (10) and said sliding member towards said rear end, a rope (18) attached to said sliding member disposed to pull it towards the front end;
  c. a brake arrangement consisting of at least first and second brake contacts ($B_3$, $B_2$) disposed towards said cart rear end longitudinally along said first guide rod (27) for engagement by said first slide contact (N) including a first circuit having first step resistance means ($R_2$) coupled to said brake (25) and said first rod (27), said first slide contact (N) closing said first circuit when touching one of said first and second brake contacts ($B_3$, $B_2$), the first of said brake contacts ($B_3$) supplying a greater electromagnetic brake force on said brake (25) via said first step resistance means ($R_2$) than the second brake contact ($B_2$);

d. a drive arrangement consisting of at least first and second drive contacts ($A_2$, $A_1$) disposed towards said cart front end, longitudinally along said second guide rod (26) for engagement by said second slide contact (M) including a second circuit having second step resistance means ($R_1$) coupled to said motor (24) and said second rod (26), said second slide contact (M) closing said second circuit when touching one of said first and second drive contacts ($A_2$, $A_1$), the first of said contacts ($A_1$) supplying a greater amount of power to said motor (24) via said second step resistance means ($R_1$) than the second drive contact ($A_2$), whereby when said rope (18) pulls said sliding member (20) from the rear end towards said front end, said brake (25) decreases as said first slide contact (N) moves forward from said first brake contact ($B_3$) to said second brake contact ($B_2$), so as to lessen the brake effect on said drive shaft, said motor starting up as said second slide contact (M) touches said first drive contact ($A_2$) and the drive speed increasing as said slide contact (M) touches said second drive contact ($A_1$), said actions being reversed as said rope is released and said spring (21) pulls said slide member (20) backwards.

\* \* \* \* \*